US010467800B2

(12) United States Patent
Du et al.

(10) Patent No.: US 10,467,800 B2
(45) Date of Patent: Nov. 5, 2019

(54) METHOD AND APPARATUS FOR RECONSTRUCTING SCENE, TERMINAL DEVICE, AND STORAGE MEDIUM (71) Applicant: Baidu Online Network Technology (Beijing) Co., Ltd., Beijing (CN)

(72) Inventors: Tangwu Du, Beijing (CN); Rui Ai, Beijing (CN); Zhaoyan Jiang, Beijing (CN); Li Liu, Beijing (CN); Xianpeng Lang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/749,642

(22) PCT Filed: Dec. 8, 2015

(86) PCT No.: PCT/CN2015/096623
§ 371 (c)(1),
(2) Date: Feb. 1, 2018

(87) PCT Pub. No.: WO2017/020467
PCT Pub. Date: Feb. 9, 2017

(65) Prior Publication Data
US 2018/0225864 A1    Aug. 9, 2018

(30) Foreign Application Priority Data
Aug. 3, 2015    (CN) .......................... 2015 1 0483318

(51) Int. Cl.
*G06T 15/20*    (2011.01)
*G06F 16/583*    (2019.01)
(Continued)

(52) U.S. Cl.
CPC ........ *G06T 15/205* (2013.01); *G06F 16/5838* (2019.01); *G06K 9/00* (2013.01);
(Continued)

(58) Field of Classification Search
CPC ..... G06T 15/205; G06T 17/00; G06T 15/005; G06T 5/002; G06T 17/005; G06T 7/593;
(Continued)

(56) References Cited

U.S. PATENT DOCUMENTS 6,094,198 A    7/2000    Amnon
2004/0184655 A1*  9/2004  Ziegler ................... G06T 17/10
                                                            382/154
(Continued)

FOREIGN PATENT DOCUMENTS

CN    101739721 A    6/2010
CN    101777059 A    7/2010
(Continued)

OTHER PUBLICATIONS

Cheng, M-M et al., "ImageSpirit: Verbal Guide Image Parsing," ACM Transactions on Graphics (TOG), 2014, 34(1) (10 pages).
(Continued)

*Primary Examiner* — Ross Varndell
(74) *Attorney, Agent, or Firm* — Nixon Peabody LLP (57) ABSTRACT A scene reconstruction method, apparatus, terminal device, and storage medium. The method includes: acquiring a first image set matching a to-be-reconstructed scene (11); extracting a characteristic region of an image in the first image set by using a characteristic extraction algorithm (12); performing recognition on the characteristic region to obtain a scene characteristic region in the image (13); and performing three-dimensional reconstruction on the to-be-reconstructed scene according to the scene characteristic region in the image, and rendering and generating the to-be-reconstructed scene (14). Some useless and unstable characteristic regions are filtered off, and the three-dimensional reconstruction on the to-be-reconstructed scene is performed only according to the scene characteristic region associated with
(Continued)

the to-be-reconstructed scene, thereby improving the efficiency and accuracy of reconstruction.

13 Claims, 2 Drawing Sheets

(51) Int. Cl.
*G06K 9/00* (2006.01)
*G06T 17/00* (2006.01)
*G06T 13/80* (2011.01)
*G06T 19/00* (2011.01)

(52) U.S. Cl.
CPC .......... *G06K 9/00624* (2013.01); *G06T 13/80* (2013.01); *G06T 17/00* (2013.01); *G06T 19/003* (2013.01)

(58) Field of Classification Search
CPC ........... G06T 7/55; G06T 17/20; G06T 17/10; G06K 9/6215; H04N 13/239; H04N 13/282; H04N 13/275
See application file for complete search history.

(56) References Cited

U.S. PATENT DOCUMENTS

| | | | |
|---|---|---|---|
| 2008/0181486 A1* | 7/2008 | Spooner | G06T 7/55 382/154 |
| 2009/0129666 A1* | 5/2009 | Goevert | G01C 11/06 382/154 |
| 2010/0250617 A1 | 9/2010 | Aihara et al. | |
| 2013/0258064 A1* | 10/2013 | Bae | H04N 5/23232 348/47 |
| 2017/0186242 A1 | 6/2017 | Kaino | |

FOREIGN PATENT DOCUMENTS

| | | |
|---|---|---|
| CN | 101984463 A | 3/2011 |
| CN | 103139479 A | 6/2013 |
| CN | 104699842 A | 6/2015 |
| JP | 2003-153894 A | 5/2003 |
| JP | 2009-129182 A | 6/2009 |

OTHER PUBLICATIONS

Kim, E et al., "A Hierarchical Image Clustering Cosegmentation Framework," IEEE Conference on Computer Vision and Pattern Recognition (CVPR), 2012, pp. 686-693 (8 pages).

European Patent Office, Extended European Search Report for European Patent Application No. EP 15 90 0236, dated Mar. 21, 2018 (6 pages).

International Search Report in International Application No. PCT/CN2015/096623, dated May 4, 2016 (8 pages) (with English translation).

Written Opinion in International Application No. PCT/CN2015/096623, dated May 4, 2016 (15 pages) (with English translation).

* cited by examiner

METHOD AND APPARATUS FOR RECONSTRUCTING SCENE, TERMINAL DEVICE, AND STORAGE MEDIUM

CROSS-REFERENCE TO RELATED APPLICATION

This application is a U.S. National Stage of International Application No. PCT/CN2015/096623, filed Dec. 8, 2015, which is related to and claims the priority from Chinese Application No. 201510483318.4, filed on Aug. 3, 2015, entitled "Method and Apparatus for Reconstructing Scene" in the name of Baidu Online Network Technology (Beijing) Co., Ltd., both of the entire disclosures of which are hereby incorporated by reference in their entireties.

TECHNICAL FIELD

Embodiments of the present disclosure relate to the field of image processing technology, and particularly to a method and apparatus for reconstructing a scene, a terminal device, and a storage medium.

BACKGROUND

Many historic and cultural relics will lose their shine as time goes by, or may even be destroyed by natural disasters. With the development of technology and tourism, more people use consumer-level cameras to capture the scenery of historic and cultural relics at particular moments and from particular viewing angles, and many of them choose to publish the contents they have captured on the Internet, to allow others to enjoy the beautiful scenery they have seen.

On the other hand, a mass of images captured by numerous users can be acquired by using a powerful search engine or by using a particular collection method. These images may be distributed at different moments of a day, or in different seasons of a year, or even in different years. Therefore, different sceneries of relics over a large temporal and spatial scale can be presented to the public by means of image screening and reconstruction.

However, in the collected images, there are a large number of irregular and useless images, which need to be removed manually in the prior art, requiring high manpower costs. In addition, the time required for reconstruction increases exponentially as the amount of image data increases, leading to low reconstruction efficiency.

SUMMARY

Embodiments of the present disclosure provide a method and apparatus for reconstructing a scene, a terminal device, and a storage medium, which can improve the efficiency of reconstruction.

According to a first aspect, an embodiment of the present disclosure provides a method for reconstructing a scene, comprising: acquiring a first image set matching a to-be-reconstructed scene; extracting a characteristic region of an image in the first image set by using a characteristic extraction algorithm; performing recognition on the characteristic region to obtain a scene characteristic region in the image; and performing three-dimensional reconstruction on the to-be-reconstructed scene according to the scene characteristic region in the image, and rendering and generating the to-be-reconstructed scene.

According to a second aspect, an embodiment of the present disclosure provides an apparatus for reconstructing a scene, comprising: an image acquiring module, configured to acquire a first image set matching a to-be-reconstructed scene; a characteristic extraction module, configured to extract a characteristic region of an image in the first image set by using a characteristic extraction algorithm; a characteristic recognition module, configured to perform recognition on the characteristic region to obtain a scene characteristic region in the image; and a reconstruction module, configured to perform three-dimensional reconstruction on the to-be-reconstructed scene according to the scene characteristic region in the image, and render and generate the to-be-reconstructed scene.

According to a third aspect, an embodiment of the present disclosure provides a terminal device for reconstructing a scene, comprising: one or more processors; and a memory; wherein one or more modules are stored in the memory, and when executed by the one or more processors, the one or more modules cause the one or more processors to perform operations comprising: acquiring a first image set matching a to-be-reconstructed scene; extracting a characteristic region of an image in the first image set by using a characteristic extraction algorithm; performing recognition on the characteristic region to obtain a scene characteristic region in the image; and performing three-dimensional reconstruction on the to-be-reconstructed scene according to the scene characteristic region in the image, and rendering and generating the to-be-reconstructed scene.

According to a fourth aspect, an embodiment of the present disclosure provides a non-transitory computer storage medium storing one or more modules, the one or more modules when executed by a device for executing a method of reconstructing a scene, causing the device to perform operations comprising: acquiring a first image set matching a to-be-reconstructed scene; extracting a characteristic region of an image in the first image set by using a characteristic extraction algorithm; performing recognition on the characteristic region to obtain a scene characteristic region in the image; and performing three-dimensional reconstruction on the to-be-reconstructed scene according to the scene characteristic region in the image, and rendering and generating the to-be-reconstructed scene.

In the technical solutions of the embodiments of the present disclosure, some useless and unstable characteristic regions are filtered off, and the three-dimensional reconstruction on the to-be-reconstructed scene is performed only according to the scene characteristic region associated with the to-be-reconstructed scene, thereby improving the efficiency and accuracy of reconstruction.

DETAILED DESCRIPTION OF EMBODIMENTS

The present invention will be further described below in detail in combination with the accompanying drawings and the embodiments. It should be appreciated that the specific embodiments described herein are merely used for explaining the present invention, rather than limiting the present invention. In addition, it should also be noted that, for the ease of description, only the parts related to the relevant invention are shown in the accompanying drawings.

The scene reconstruction method provided in the embodiments of the present disclosure may be executed by the scene reconstruction apparatus provided in the embodiments of the present disclosure, or by a server device that integrates the scene reconstruction apparatus. The scene reconstruction apparatus may be implemented by using software or hardware.

First Embodiment

Figure 1:
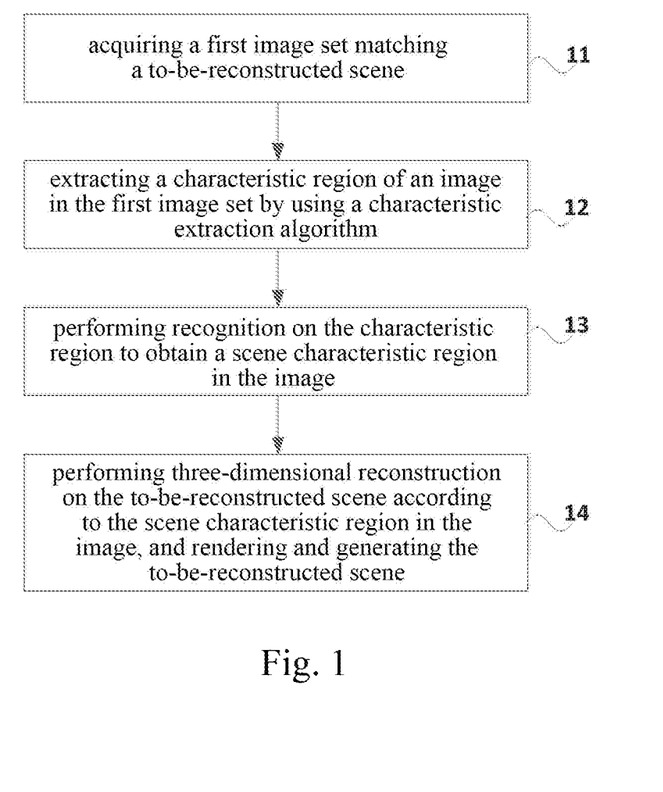
FIG. 1 is a schematic flow chart of a scene reconstruction method according to a first embodiment of the present disclosure.

FIG. 1 is a schematic flow chart of a scene reconstruction method according to a first embodiment of the present disclosure. As shown in FIG. 1, the method specifically includes the following steps.

S11, a first image set that matches a to-be-reconstructed scene is acquired.

In this embodiment, the to-be-reconstructed scene may be a tourist attraction, a historic relic, a historic building, and so on. The first image set includes at least one image that matches the to-be-reconstructed scene. Specifically, the first image set may be obtained by searching on the Internet according to a keyword related to the to-be-reconstructed scene, or may be acquired from a user generated content (UGC) image library.

The UGC image library stores image contents shared by users on the Internet. Most of such image contents are from photographs taken by users, or may be images created by users. As there are a variety of cameras available on the market and different images are captured at different time points, from different positions and using different methods, the UGC image library records different appearances of a scene from different points of view, at different time points (in different seasons or at different time of the day), and under different light conditions (cloudy, clear, rain, or snow). As the amount of data uploaded by users increases sharply, the UGC image library has such characteristics as wide coverage and low costs in acquiring data. Therefore, valuable image contents can be acquired from the UGC image library.

S12, at least one characteristic region of an image in the first image set is extracted by using a characteristic extraction algorithm.

Suitable characteristic extraction algorithms include a corner detection algorithm, local invariant characteristic extraction algorithm, and so on.

In addition, to enhance the independency and validity of characteristics in the image, the image needs to be preprocessed before the image characteristic extraction is performed. The pre-processing mainly includes image characteristic segmentation. That is, the image is divided into several particular regions having unique characteristics, followed by the extraction of target objects (for example, a human region, a scenery region, and an object region in the image). In this embodiment, suitable image segmentation methods mainly include a threshold-based segmentation method, a region-based segmentation method, an edge-based segmentation method, and a segmentation method based on a particular theory.

S13, recognition is performed on the characteristic region to obtain a scene characteristic region in the image.

In step S12 above, after the characteristic region is extracted from the image, the characteristic region needs to be recognized, for subsequently distinguishing the characteristic region; and a characteristic region that matches the to-be-reconstructed scene, that is, a scene characteristic region, is determined in the image. In this step, the image characteristic region may be recognized by using the following characteristic recognition algorithms: an image recognition algorithm based on statistical image characteristics, a target recognition algorithm based on HOG characteristics, and an object recognition algorithm based on local characteristics.

S14, three-dimensional reconstruction on the to-be-reconstructed scene is performed according to the scene characteristic region in the image, and the to-be-reconstructed scene is rendered and generated.

The scene characteristic region may be the contour of a scene that matches a scenic spot in the to-be-reconstructed scene. Assuming that the scenic spot in the to-be-reconstructed scene is the Longmen Grottoes, the characteristic region may be selected from the contours of multiple objects of Buddha statues (for example, the faces, eyes, and hands of Buddha statues) in the Longmen Grottoes.

The specific three-dimensional reconstruction process can be implemented using an existing reconstruction method, and the details will not be described here. By means of the three-dimensional reconstruction, information about the spatial location of each image has been restored. However, such static, discrete images are not suitable for presenting a scene. To ensure the continuity in space of such images and better present the three-dimensional characteristics of the to-be-reconstructed scene, an image rendering technology is used in this embodiment: inserting a virtual image between neighboring images to be rendered, and rendering and generating the to-be-reconstructed scene.

Specifically, information about the real position of the camera when two images are captured may be restored by using the three-dimensional reconstruction technology according to the image characteristic region. To achieve a virtual 3D transition effect, a virtual camera position needs to be inserted during rendering. In addition, considering the difference between UGC photographs, interpolation processing needs to be performed on intrinsic parameters of the camera. Because the two images have common three-dimensional points, these points may be projected onto the imaging plane of a virtual camera, thus establishing a mappling relationship between the two images and a virtual image. For example, when an image A is spatially associated with many images B nearby but the three-dimensional structures of scenes in the images do not indicate a particular order, common three-dimensional points of the two images A and B to be rendered are projected onto the imaging plane of the virtual camera, and then triangulation is generated for characteristic regions on the images A and B and the imaging plane of the virtual camera. In this way, corresponding triangular regions are formed on the images A and B and the imaging plane of the virtual camera. It may be considered that the inside of the triangle is a plane. Then, for the imaging plane of the virtual camera, according to the correspondence between the triangular regions, pixel points are respectively taken from the images A and B and added to the triangular region on the imaging plane of the virtual camera, thus generating a complete virtual image. Whereby, a transition effect with accurate three-dimensional space structures and rich details is provided.

In the rendering process, the virtual camera is moved between the two real cameras, and when the virtual camera approaches one of the real cameras, the deformation generated by the projection from the real camera to the virtual camera is small. An optimal virtual transition effect may be achieved by setting different weights.

By means of this embodiment, some useless and unstable characteristic regions are filtered off, and the three-dimensional reconstruction of the to-be-reconstructed scene is performed only according to the scene characteristic region associated with the to-be-reconstructed scene, thereby improving the efficiency and accuracy of reconstruction.

For example, the characteristic region further includes: at least one of a human characteristic region, an object characteristic region, and a scenery characteristic region.

Specifically, during the process of recognizing the characteristic region, the characteristic region included in the image may be classified. The characteristic region included in the image is classified into at least one of a human characteristic region, an object characteristic region, a scenery characteristic region, and a scene characteristic region by using a clustering algorithm.

The human characteristic region refers to a characteristic region using a human as the subject. The object characteristic region a characteristic region using an object as the subject. The scenery characteristic region a characteristic region using a natural scenery (for example, sky, clouds, and trees) as the subject. The scene characteristic region is a characteristic region that is located in the to-be-reconstructed scene and that is related to the to-be-reconstructed scene, including a scenic spot, a building, and so on.

Correspondingly, to reduce the data amount involved in three-dimensional reconstruction and increase the efficiency of reconstruction, before the performing three-dimensional reconstruction of the to-be-reconstructed scene according to the scene characteristic region in the image, the method further includes:

deleting the human characteristic region, the object characteristic region, and the scenery characteristic region from the image.

Specifically, after the characteristic region is extracted from the image, to reduce the data amount involved in three-dimensional reconstruction and increase the efficiency of reconstruction, filtering needs to be performed on the extracted characteristic region. Specifically, when the image includes a tree, a human, and a cloud, a large number of useless and unstable feature points may be extracted from pixel regions corresponding to the tree, cloud, and human. Such characteristics irrelevant to the to-be-reconstructed scene may be removed, to reduce the time required for three-dimensional reconstruction.

For example, to further reduce the data amount to be processed, useless images may further be deleted from the acquired image set. Specifically, the acquiring a first image set that matches a to-be-reconstructed scene includes:

searching for a second image set related to the to-be-reconstructed scene in the Internet or a user generated content (UGC) image library by using an image recognition technology; and deleting images that do not meet a preset requirement from the second image set, and using the remaining images as the first image set that matches the to-be-reconstructed scene.

The images that do not meet the preset requirement include images whose sizes do not meet a requirement, images using a human as the subject, images using a scenery (for example, sky, clouds, and trees) as the subject, images using an object (souvenir) as the subject, images using a shop as the subject, incorrectly labeled images irrelevant to the selected scene, and so on.

Specifically, the images in the second image set are classified by using a clustering algorithm. During the classification process, due to the complexity of the scene included in the image, one image may include multiple types of information. Therefore, one image may be classified under multiple categories. In this embodiment, to prevent the deletion of some useful images and ensure the accuracy of classification, the image is preliminarily segmented by using the method in the following literature 1, to delete images that do not meet the preset requirement, that is, images that mainly include sky, trees, and human. Literature 1: Cheng M M, Zheng S, Lin W Y, et al. ImageSpirit: Verbal guided image parsing[J]. ACM Transactions on Graphics (TOG), 2014, 34(1): 3. (Ming-Ming Cheng, Shuai Zheng, Wen-Yan Lin, Vibhav Vineet, Paul Sturgess, Nigel Crook, Niloy Mitra, Philip Torr; ImageSpirit: Verbal Guided Image Parsing, ACM Transactions on Graphics (TOG); 2014)

Then, characteristic regions are extracted from the images in the remaining image set by using the method in the following literature 2, the images in the remaining image set are clustered into different sets according to the characteristic regions, and then the image set including the largest number of images is found. If the number of images in this image set exceeds a set threshold, it may be considered that this image set covers the contents of most images of the to-be-reconstructed scene, and can be directly used as reconstruction images. Literature 2: Kim E, Li H, Huang X. A hierarchical image clustering cosegmentation framework [C]//Computer Vision and Pattern Recognition (CVPR), 2012 IEEE Conference on. IEEE, 2012: 686-693. (Edward Kim, Hongsheng Li, Xiaolei Huang; A Hierarchical Image Clustering Cosegmentation Framework; Conference on Computer Vision and Pattern; 2012).

In addition, one scene may correspond to multiple viewing angles, indicating that there may be multiple centers of clustering. In this case, the connectivity between categories needs to be determined by using a feature matching algorithm. If the number of matching characteristics between an image set and the above-mentioned image set including the largest number of images exceeds a set threshold, this image set is also used as reconstruction images.

For example, after the performing three-dimensional reconstruction of the to-be-reconstructed scene according to the scene characteristic region in the image, and before the rendering and generating the to-be-reconstructed scene, the method further includes:

selecting images including more than a preset number of scene characteristic regions from the images as key frames;

determining a neighboring relationship between the key frames according to a spatial relationship between scenes displayed in the key frames and times when the images are captured; and performing path planning for the to-be-reconstructed scene according to determined neighboring key frames.

For example, the performing path planning for the to-be-reconstructed scene according to determined neighboring key frames includes:

if there is a temporal difference between neighboring key frames, inserting, between the neighboring key frames, a transitional image falling within a time period corresponding to the temporal difference; and if there is a spatial difference between neighboring key frames, selecting an image spatially associated with the key frames as a transitional image.

The time when the image is captured may be acquired by parsing image header information of the image. In addition, original photographing information of some images may be lost during propagation, and the times when the images are captured cannot be directedly acquired. In this embodiment, such images may be classified as a morning, noon, or night type by using a machine learning method according to the illuminance change in the image.

The images in the above image sets used for reconstruction are neither evenly distributed in space, nor regularly distributed in time.

In this embodiment, a set of images that can provide a richest presentation in space is selected from a large number of images by calculating rendering costs between images using a shortest-path planning method. Therefore, the rendering cost not only includes such information as the spatial position, viewpoint direction, light field, degree of deformation, and resolution of the image, but also takes into consideration the temporal difference between images.

Specifically, first, some images needs to be selected from the first image set as key frames. A rule for selecting a key frame is: selecting an image that includes more than a preset number of scene characteristic regions. In addition, there should be a large number of images near the position at which the key frame is captured, and the key frames need to be distributed in different time ranges.

The method for selecting the key frame is specifically as follows. First, an image including the largest number of three-dimensional points is selected, where the image is used a starting image. Then, a next image is searched for. The condition for selecting a next image as a key frame is that the next image has sufficient new three-dimensional points. In addition, it needs to be determined through calculation whether there are sufficient other images within a given space around the image. Then, the temporal difference between the image and the previous image is calculated. If the difference is not large enough, an image having a larger difference from the previous image may be found from images near the current image, to replace the current image as a key frame. It should be noted that because the collected image contents may not be abundant enough, the degrees of importance of the constraint conditions are different. The most important condition is that the key frame needs to include sufficient feature points. By analogy, the number of key frames is gradually increased by using the above-mentioned key frame selection method. When the number of key frames selected reaches a threshold, the key frame selection is ended.

The selected key frames can only roughly cover the to-be-reconstructed scene, and in the prior art, a transition cannot be directly provided between neighboring key frames by using an image rendering technology. Therefore, a set of images needs to be found between the key frames to achieve a smooth transition between the key frames. In addition, because the key frames are somewhat different, the difference between images should be used as much as possible during the image selection process.

Specifically, assuming that a set of images need to be selected from key frames A and rendered to a key frame B, and selected transitional images are labelled as p1, p2, . . . , and pn. First, it is determined whether there is a temporal difference between the key frames A and B. If the image A is of the morning type and the image B is of the night type, the selected transitional image p should fall within this period of time as much as possible, so as to maintain a good continuity in vision, and avoid the frequent switching between day and night. Then, if there are sufficient images near the key frame A, it may be considered that better spatial information may be presented around the image A. Therefore, many images near the image A may be selected, and a good image rendering method may be used to highlight the three-dimensional structure of the scene.

For example, the rendering and generating the to-be-reconstructed scene includes:

rendering and generating reconstructed scenes at different times according to the times when the images in the first image set are captured.

Because the images in the first image set are captured at different times or even in different years, reconstructed scenes at different times may be rendered and generated according to times when the images are captured.

Likewise, in the above embodiments, some useless and unstable characteristic regions are filtered off, and the three-dimensional reconstruction of the to-be-reconstructed scene is performed only according to the scene characteristic region associated with the to-be-reconstructed scene, thereby improving the efficiency and accuracy of reconstruction.

In addition, the use of the path planning technology further ensures the continuity between images during rendering, and improves the visual effect.

Second Embodiment

Figure 2:
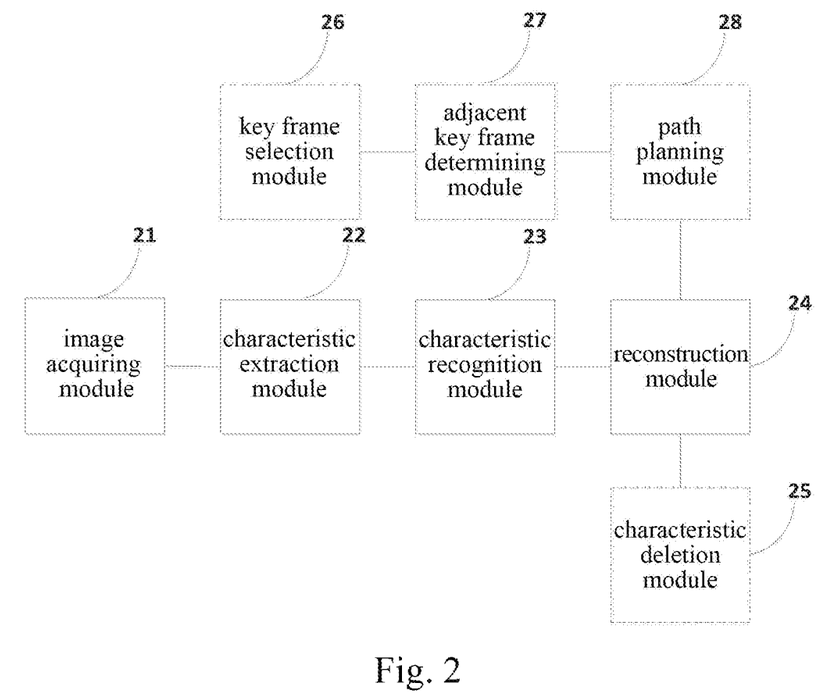
FIG. 2 is a schematic structural diagram of a scene reconstruction apparatus according to a second embodiment of the present disclosure.

FIG. 2 is a schematic structural diagram of a scene reconstruction apparatus according to a second embodiment of the present disclosure. As shown in FIG. 2, the apparatus specifically includes an image acquiring module 21, a characteristic extraction module 22, a characteristic recognition module 23, and a reconstruction module 24.

The image acquiring module 21 is configured to acquire a first image set matching a to-be-reconstructed scene.

The characteristic extraction module 22 is configured to extract a characteristic region of an image in the first image set by using a characteristic extraction algorithm.

The characteristic recognition module 23 is configured to perform recognition on the characteristic region to obtain a scene characteristic region in the image.

The reconstruction module 24 is configured to perform three-dimensional reconstruction on the to-be-reconstructed scene according to the scene characteristic region in the image, and render and generate the to-be-reconstructed scene.

The scene reconstruction apparatus according to this embodiment is used to execute the scene reconstruction methods described in the above embodiments. Their technical principles and technical effects are similar, and the details will not be repeated here.

For example, based on the above embodiment, the characteristic region further includes at least one of a human characteristic region, an object characteristic region, and a scenery characteristic region, and correspondingly, the apparatus further includes a characteristic deletion module 25.

The characteristic deletion module 25 is configured to delete the human characteristic region, the object characteristic region, and the scenery characteristic region from the image, before the reconstruction module 24 performs three-dimensional reconstruction on the to-be-reconstructed scene according to the scene characteristic region in the image.

For example, based on the above embodiment, the image acquiring module 21 is specifically configured to:

search for a second image set related to the to-be-reconstructed scene on the Internet or a user generated content (UGC) image library by using an image recognition technology; and delete images that do not meet a preset requirement from the second image set, and use the remaining images as the first image set that matches the to-be-reconstructed scene.

For example, based on the above embodiment, the apparatus further includes a key frame selection module 26, a neighboring key frame determining module 27, and a path planning module 28.

The key frame selection module 26 is configured to select images including more than a preset number of scene characteristic regions from the images as key frames, after the reconstruction module 24 performs three-dimensional reconstruction on the to-be-reconstructed scene according to the scene characteristic region in the image and before the reconstruction module 24 renders and generates the to-be-reconstructed scene.

The neighboring key frame determining module 27 is configured to determine a neighboring relationship between the key frames according to a spatial relationship between scenes displayed in the key frames and times when the images are captured.

The path planning module 28 is configured to perform path planning for the to-be-reconstructed scene according to a determined neighboring key frames.

For example, based on the above embodiment, the path planning module 28 is specifically configured to:

if there is a temporal difference between neighboring key frames, insert, between the neighboring key frames, a transitional image falling within a time period corresponding to the temporal difference; and if there is a spatial difference between the neighboring key frames, select an image spatially associated with the key frames as a transitional image.

For example, based on the above embodiment, the reconstruction module 24 is specifically configured to:

render and generate reconstructed scenes at different times according to the times when the images in the first image set are captured.

The scene reconstruction apparatus according to the above embodiments is also used to execute the scene reconstruction methods described in the above embodiments. Their technical principles and technical effects are similar, and the details will not be repeated here.

Third Embodiment

Figure 3:
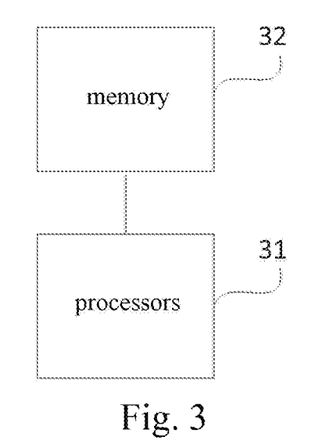
FIG. 3 is a schematic structural diagram of a terminal device for implementing scene reconstruction according to a third embodiment of the present disclosure.

FIG. 3 is a schematic structural diagram of hardware of a terminal device for implementing scene reconstruction according to a third embodiment of the present disclosure. The terminal device includes one or more processors 31, a memory 32, and one or more modules. The one or more modules (for example, the image acquiring module 21, the characteristic extraction module 22, the characteristic recognition module 23, the reconstruction module 24, the characteristic deletion module 25, the key frame selection module 26, the neighboring key frame determining module 27, and the path planning module 28 in the scene reconstruction apparatus shown in FIG. 2) are stored in the memory 32. In FIG. 3, one processor 31 is used an example. The processor 31 and the memory 32 in the terminal device may be connected using a bus or by other means. In FIG. 3, connection using a bus is used as an example.

When the one or more processors 31 execute, the following operations are performed:

acquiring a first image set that matches a to-be-reconstructed scene;

extracting at least one characteristic region of an image in the first image set by using a characteristic extraction algorithm;

performing recognition on the characteristic region to obtain a scene characteristic region in the image; and performing three-dimensional reconstruction on the to-be-reconstructed scene according to the scene characteristic region in the image, and rendering and generating the to-be-reconstructed scene.

The terminal device can execute the method provided in the first embodiment of the present disclosure, and has corresponding functional modules for executing the method as well as beneficial effects.

For example, the characteristic region preferably includes at least one of a human characteristic region, an object characteristic region, and a scenery characteristic region, and before performing three-dimensional reconstruction on the to-be-reconstructed scene according to the scene characteristic region in the image, the processor 31 deletes the human characteristic region, the object characteristic region, and the scenery characteristic region from the image.

For example, the processor 31 searches for a second image set related to the to-be-reconstructed scene on the Internet or a user generated content (UGC) image library by using an image recognition technology; and deletes images that do not meet a preset requirement from the second image set, and using the remaining images as the first image set that matches the to-be-reconstructed scene.

For example, after performing three-dimensional reconstruction on the to-be-reconstructed scene according to the scene characteristic region in the image and before rendering and generating the to-be-reconstructed scene, the processor 31 selects images including more than a preset number of scene characteristic regions from the images as key frames; determining a neighboring relationship between the key frames according to a spatial relationship between scenes displayed in the key frames and times when the images are captured; and performs path planning for the to-be-reconstructed scene according to determined neighboring key frames.

For example, if there is a temporal difference between neighboring key frames, the processor 31 inserts, between the neighboring key frames, a transitional image falling within a time period corresponding to the temporal difference; and if there is a spatial difference between neighboring key frames, the processor 31 selects an image spatially associated with the key frames as a transitional image.

For example, the processor 31 renders and generates reconstructed scenes at different time points according to time generates reconstructed scenes at different times according to the times when the images in the first image set are captured.

Fourth Embodiment

An embodiment of the present disclosure provides a non-transitory computer storage medium storing one or more modules, the one or more modules when executed by a device for executing a method of reconstructing a scene, causing the device to perform operations comprising:

acquiring a first image set matching a to-be-reconstructed scene;

extracting a characteristic region of an image in the first image set by using a characteristic extraction algorithm;

performing recognition on the characteristic region to obtain a scene characteristic region in the image; and performing three-dimensional reconstruction on the to-be-reconstructed scene according to the scene characteristic region in the image, and rendering and generating the to-be-reconstructed scene.

When the modules stored in the storage medium are executed, the characteristic region comprises: at least one of a human characteristic region, an object characteristic region, and a scenery characteristic region. Before the performing three-dimensional reconstruction on the to-be-reconstructed scene according to the scene characteristic region in the image, the operations further comprise:

deleting the human characteristic region, the object characteristic region, and the scenery characteristic region from the image.

When the modules stored in the storage medium are executed, the acquiring a first image set matching a to-be-reconstructed scene comprises:

searching for a second image set related to the to-be-reconstructed scene on the Internet or a user generated content (UGC) image library by using an image recognition technology; and deleting images not meeting a preset requirement from the second image set, and using remaining images as the first image set matching the to-be-reconstructed scene.

When the modules stored in the storage medium are executed, after the performing three-dimensional reconstruction on the to-be-reconstructed scene according to the scene characteristic region in the image, and before the rendering and generating the to-be-reconstructed scene, the operations further comprise:

selecting images comprising more than a preset number of scene characteristic regions from the images as key frames;

determining a neighboring relationship between the key frames according to a spatial relationship between scenes displayed in the key frames and times when the images are captured; and performing path planning for the to-be-reconstructed scene according to determined neighboring key frames.

When the modules stored in the storage medium are executed, the performing path planning for the to-be-reconstructed scene according to determined neighboring key frames comprises:

if there is a temporal difference between the neighboring key frames, inserting, between the neighboring key frames, a transitional image within the temporal difference; and if there is a spatial difference between the neighboring key frames, selecting an image spatially associated with the key frames as a transitional image.

When the modules stored in the storage medium are executed, the rendering and generating the to-be-reconstructed scene comprises:

rendering and generating reconstructed scenes at different times according to the times when the images in the first image set are captured.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for reconstructing a scene, comprising:
acquiring a first image set matching a to-be-reconstructed scene;
extracting a characteristic region of an image in the first image set by using a characteristic extraction algorithm;
performing recognition on the characteristic region to obtain a scene characteristic region in the image; and
performing three-dimensional reconstruction on the to-be-reconstructed scene according to the scene characteristic region in the image, and rendering and generating the to-be-reconstructed scene,
wherein the acquiring a first image set matching a to-be-reconstructed scene comprises:
searching for a second image set related to the to-be-reconstructed scene on the Internet or a user generated content (UGC) image library by using an image recognition technology; and
deleting images not meeting a preset requirement from the second image set, and using remaining images as the first image set matching the to-be-reconstructed scene.

2. The method according to claim 1, wherein the characteristic region comprises: at least one of a human characteristic region, an object characteristic region, and a scenery characteristic region, and before the performing three-dimensional reconstruction on the to-be-reconstructed scene according to the scene characteristic region in the image, the method further comprises:
deleting the human characteristic region, the object characteristic region, and the scenery characteristic region from the image.

3. The method according to claim 2, wherein after the performing three-dimensional reconstruction on the to-be-reconstructed scene according to the scene characteristic region in the image, and before the rendering and generating the to-be-reconstructed scene, the method further comprises:
selecting images comprising more than a preset number of scene characteristic regions from the images as key frames;
determining a neighboring relationship between the key frames according to a spatial relationship between scenes displayed in the key frames and times when the images are captured; and
performing path planning for the to-be-reconstructed scene according to determined neighboring key frames.

4. The method according to claim 1, wherein after the performing three-dimensional reconstruction on the to-be-reconstructed scene according to the scene characteristic region in the image, and before the rendering and generating the to-be-reconstructed scene, the method further comprises:
selecting images comprising more than a preset number of scene characteristic regions from the images as key frames;
determining a neighboring relationship between the key frames according to a spatial relationship between scenes displayed in the key frames and times when the images are captured; and
performing path planning for the to-be-reconstructed scene according to determined neighboring key frames.

5. The method according to claim 4, wherein the performing path planning for the to-be-reconstructed scene according to determined neighboring key frames comprises:
if there is a temporal difference between the neighboring key frames, inserting, between the neighboring key frames, a transitional image within the temporal difference; and
if there is a spatial difference between the neighboring key frames, selecting an image spatially associated with the key frames as a transitional image.

6. The method according to claim 1, wherein the rendering and generating the to-be-reconstructed scene comprises:
rendering and generating reconstructed scenes at different times according to the times when the images in the first image set are captured.

7. The method according to claim 1, wherein after the performing three-dimensional reconstruction on the to-be-reconstructed scene according to the scene characteristic region in the image, and before the rendering and generating the to-be-reconstructed scene, the method further comprises:
selecting images comprising more than a preset number of scene characteristic regions from the images as key frames;
determining a neighboring relationship between the key frames according to a spatial relationship between scenes displayed in the key frames and times when the images are captured; and
performing path planning for the to-be-reconstructed scene according to determined neighboring key frames.

8. A terminal device for reconstructing a scene, comprising:
one or more processors; and
a memory;
wherein one or more modules are stored in the memory, and when executed by the one or more processors, the one or more modules cause the one or more processors to perform operations comprising:
acquiring a first image set matching a to-be-reconstructed scene;
extracting a characteristic region of an image in the first image set by using a characteristic extraction algorithm;
performing recognition on the characteristic region to obtain a scene characteristic region in the image; and
performing three-dimensional reconstruction on the to-be-reconstructed scene according to the scene characteristic region in the image, and rendering and generating the to-be-reconstructed scene,
wherein the acquiring a first image set matching a to-be-reconstructed scene comprises:
searching for a second image set related to the to-be-reconstructed scene on the Internet or a user generated content (UGC) image library by using an image recognition technology; and
deleting images not meeting a preset requirement from the second image set, and using remaining images as the first image set matching the to-be-reconstructed scene.

9. The terminal device according to claim 8, wherein the characteristic region comprises: at least one of a human characteristic region, an object characteristic region, and a scenery characteristic region, and before the performing three-dimensional reconstruction on the to-be-reconstructed scene according to the scene characteristic region in the image, the operations further comprise:
deleting the human characteristic region, the object characteristic region, and the scenery characteristic region from the image.

10. The terminal device according to claim 8, wherein after the performing three-dimensional reconstruction on the to-be-reconstructed scene according to the scene characteristic region in the image, and before the rendering and generating the to-be-reconstructed scene, the operations further comprise:
selecting images comprising more than a preset number of scene characteristic regions from the images as key frames;
determining a neighboring relationship between the key frames according to a spatial relationship between scenes displayed in the key frames and times when the images are captured; and
performing path planning for the to-be-reconstructed scene according to determined neighboring key frames.

11. The terminal device according to claim 10, wherein the performing path planning for the to-be-reconstructed scene according to determined neighboring key frames comprises:
if there is a temporal difference between the neighboring key frames, inserting, between the neighboring key frames, a transitional image within the temporal difference; and
if there is a spatial difference between the neighboring key frames, selecting an image spatially associated with the key frames as a transitional image.

12. The terminal device according to claim 8, wherein the rendering and generating the to-be-reconstructed scene comprises:
rendering and generating reconstructed scenes at different times according to the times when the images in the first image set are captured.

13. A non-transitory computer storage medium storing one or more modules, the one or more modules when executed by a device for executing a method of reconstructing a scene, causing the device to perform operations comprising: acquiring a first image set matching a to-be-reconstructed scene; extracting a characteristic region of an image in the first image set by using a characteristic extraction algorithm; performing recognition on the characteristic region to obtain a scene characteristic region in the image; and performing three-dimensional reconstruction on the to-be-reconstructed scene according to the scene characteristic region in the image, and rendering and generating the to-be-reconstructed scene, wherein the acquiring a first image set matching a to-be-reconstructed scene comprises: searching for a second image set related to the to-be-reconstructed scene on the Internet or a user generated content (UGC) image library by using an image recognition technology; and deleting images not meeting a preset requirement from the second image set, and using remaining images as the first image set matching the to-be-reconstructed scene.

* * * * *